(12) United States Patent
Whitinger

(10) Patent No.: US 8,474,069 B1
(45) Date of Patent: Jul. 2, 2013

(54) BARRIER FREE SHOWER PAN WITH IMPROVED DRAINAGE PATHS

(75) Inventor: Ryan L. Whitinger, Flowery Branch, GA (US)

(73) Assignee: Mti Whirlpools, Inc., Sugar Hill, GA (US)

( * ) Notice: Subject to any disclaimer, the term of this patent is extended or adjusted under 35 U.S.C. 154(b) by 474 days.

(21) Appl. No.: 12/909,245

(22) Filed: Oct. 21, 2010

(51) Int. Cl.
*A47K 3/00* (2006.01)

(52) U.S. Cl.
USPC ............................................................ 4/613

(58) Field of Classification Search
USPC ....................................................... 4/613, 612
See application file for complete search history.

(56) References Cited

U.S. PATENT DOCUMENTS

| | | | |
|---|---|---|---|
| 5,243,716 A | 9/1993 | Zaccai et al. | |
| 5,718,008 A | 2/1998 | Pane | |
| 6,178,571 B1 | 1/2001 | McAllister | |
| 6,381,773 B1 | 5/2002 | McAllister | |
| 6,941,703 B2 * | 9/2005 | MacLean et al. | 52/34 |
| 7,007,315 B2 | 3/2006 | Stonecipher | |
| 2010/0162481 A1 * | 7/2010 | Erlebach | 4/613 |
| 2010/0180374 A1 * | 7/2010 | Davoudi | 4/613 |
| 2011/0088161 A1 * | 4/2011 | Stimpson | 4/613 |
| 2011/0197355 A1 * | 8/2011 | Lemire | 4/613 |

* cited by examiner

*Primary Examiner* — Huyen Le
(74) *Attorney, Agent, or Firm* — Wallace G. Walter

(57) ABSTRACT

A shower pan (10), preferably having rectangular planform includes a central drain (20) that is centered in a floor portion that inclines at a shallow angle (i.e., 3 degrees or so) to front and back sides and opposite ends. The floor portion and includes a shallow channel (46) along the front edge of the shower pan (10) into which all or substantially all water is drained to a second channel (48) into a central drain (20). An apertured grill or cover plate assembly (36) is mounted in the channels and serves as a cover for the various channels. The shower pan (10) is typically installed so that a sill surface (50) is at the same elevation as the pre-existing floor (52) to provide an entry that does not have any type of 'trip' points or obstructions that could pose a hazard to the user or impede assistive aids, such as walkers or wheeled chairs.

10 Claims, 4 Drawing Sheets

000
BARRIER FREE SHOWER PAN WITH IMPROVED DRAINAGE PATHS

BACKGROUND

The present invention relates to shower pans or bases for use in bathrooms and the like and, more particularly, to shower pans or bases that are barrier-free, i.e., do have some type of threshold barrier.

Shower pans or bases are used as part of a installation in homes as well as in commercial installations including hotels. In general, the shower pan has a square or rectangular planform and includes a central drain through which water is removed. Typically, a short upstanding wall is provided on the entry side of the shower pan to prevent water from leaking onto the floor of the bathroom and to often provide a structure for guiding or accommodating a sliding shower door; that wall structure can also function as a "trip" point for someone entering or leaving the shower stall and also impedes mobility-impaired persons from using assistive devices (i.e., a "walker" or a wheeled chair) to enter and exit the shower.

SUMMARY

A shower pan includes a central drain that is centered in a floor portion that inclines at a shallow angle to front and back sides and opposite ends. The floor portion and includes a shallow channel along the front edge of the shower pan into which all or substantially all water is drained to a second channel into a central drain. An apertured grate or cover plate is mounted in the channels and serves as a cover for the channels. In addition, shallow grooves extend from the central drain to the corners of the floor portion further enhance drainage. The shower pan is typically installed so that a sill surface is at the same elevation as the pre-existing floor to provide an entry that does not have any type of 'trip' points or obstructions that could pose a hazard to the user or impede assistive aids, such as walkers or wheeled chairs.

DESCRIPTION OF THE PREFERRED EMBODIMENT

Figure 1:
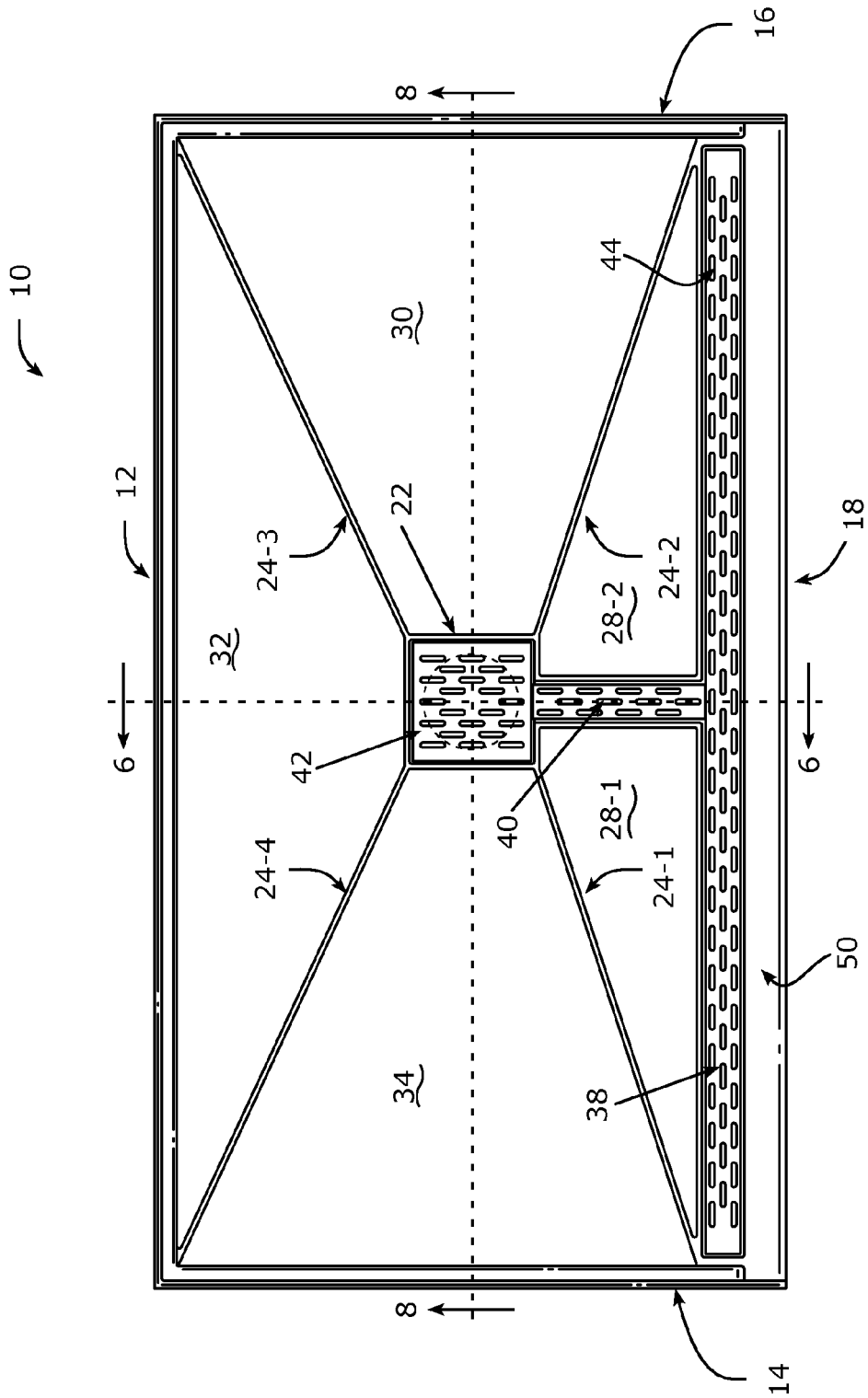
FIG. 1 is a plan view of a preferred embodiment of a shower pan.
Figure 2:
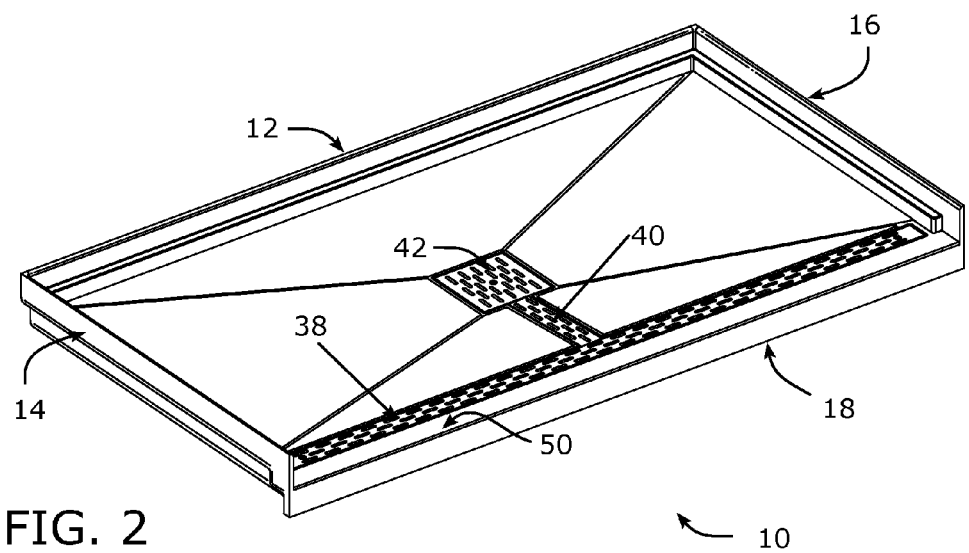
FIG. 2 is an isometric view of the shower pan of FIG. 1 from the left.
Figure 3:
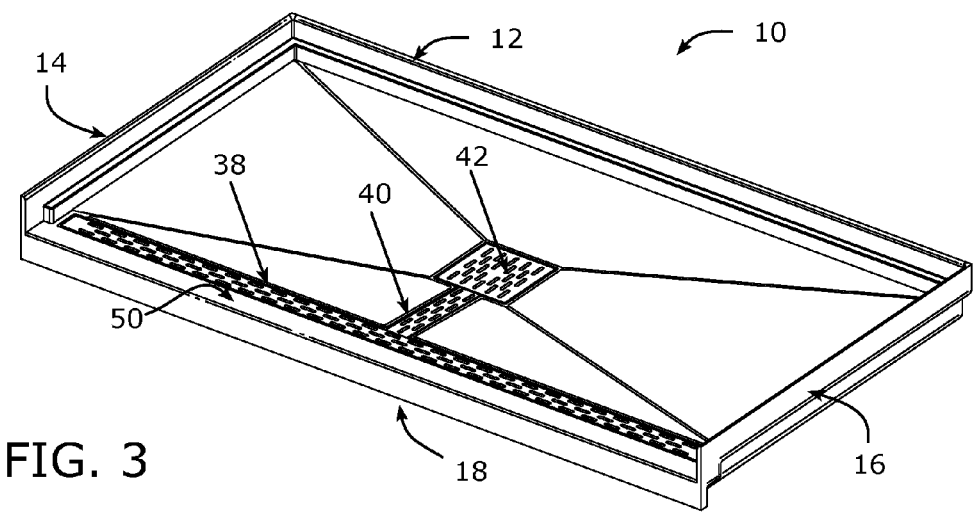
FIG. 3 is an isometric view of the shower pan of FIG. 1 from the right.
Figure 6:
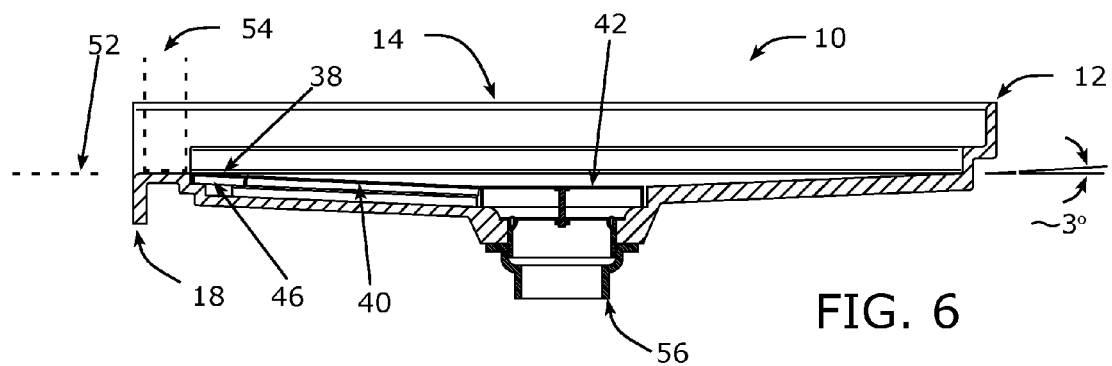
FIG. 6 is a cross-sectional view of the shower pan taken along line 6-6 of FIG. 1.

A plan view of a preferred embodiment of the shower pan is shown in FIG. 1 and in perspective in FIG. 2 and FIG. 3 and is designated generally therein by the reference character 10. As shown, the shower pan 10 has a rectangular planform with a length (about 59.5 inches) greater than its width (about 32 inches). While a rectangular planform is preferred, a square planform is equally suitable. The shower pan 10 is bounded by a rear edge 12 and two opposed end edges 14 and 16 with the forward edge defined by a depending flange 18. The shower pan 10 has a central drain 20 (FIG. 4) that is centered in a square depression or well 22. The shower pan 10 includes four shallow drain grooves 24-1, 24-2, 24-3, and 24-4 that extend from the four corners of the well 22 to and toward the rear corners of the shower pan 10 and to and adjacent the front corners of the shower pan 10 to define surface patches 28-1, 28-1, 30, 32, and 34. In the preferred form, the drain grooves 24-1, 24-2, 24-3, and 24-4 have a depth of about 0.075 inches and width of about 0.250 inches. As shown in FIG. 6 and in FIG. 8, the various surface patches 28-1, 28-1, 30, 32, and 34 rise at a shallow angle (about 3 degrees, as shown on the right in FIG. 6) as they extend outward of the well 22 toward and to the sides of the shower pan 10. If desired, the top surface of the various surface patches 28-1, 28-1, 30, 32, and 34 can be 'roughened' or 'dimpled' or 'treaded' to provide a no-slip or minimum slip surface.

Figure 4:
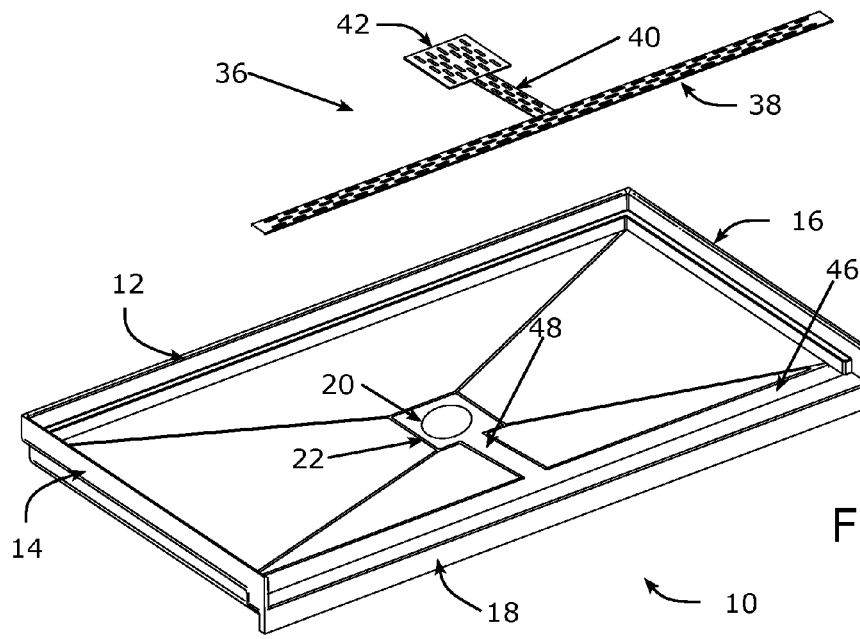
FIG. 4 is an exploded perspective of the shower pan, similar to FIG. 2, showing a removable grate spaced from the base.
Figure 7:
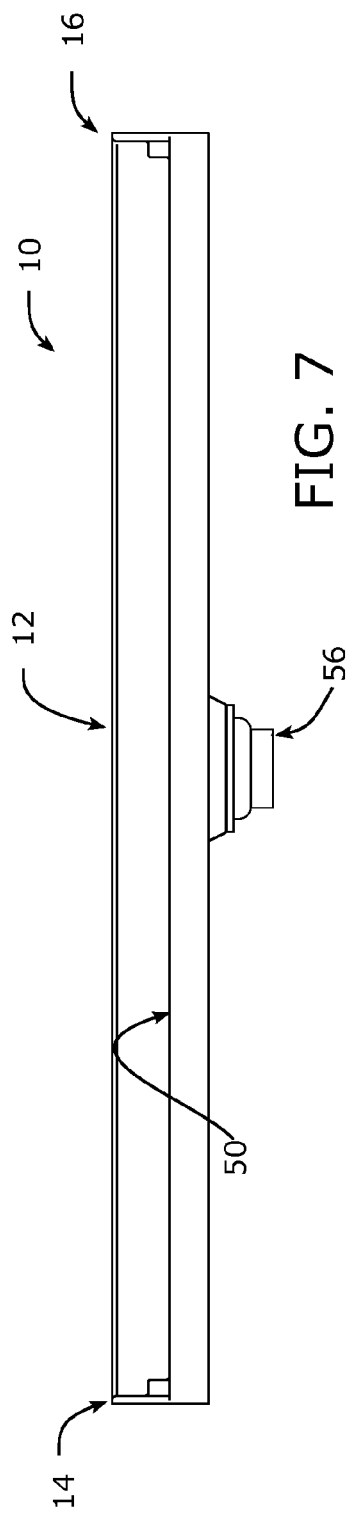
FIG. 7 is a front elevation view of the shower pan.
Figure 8:
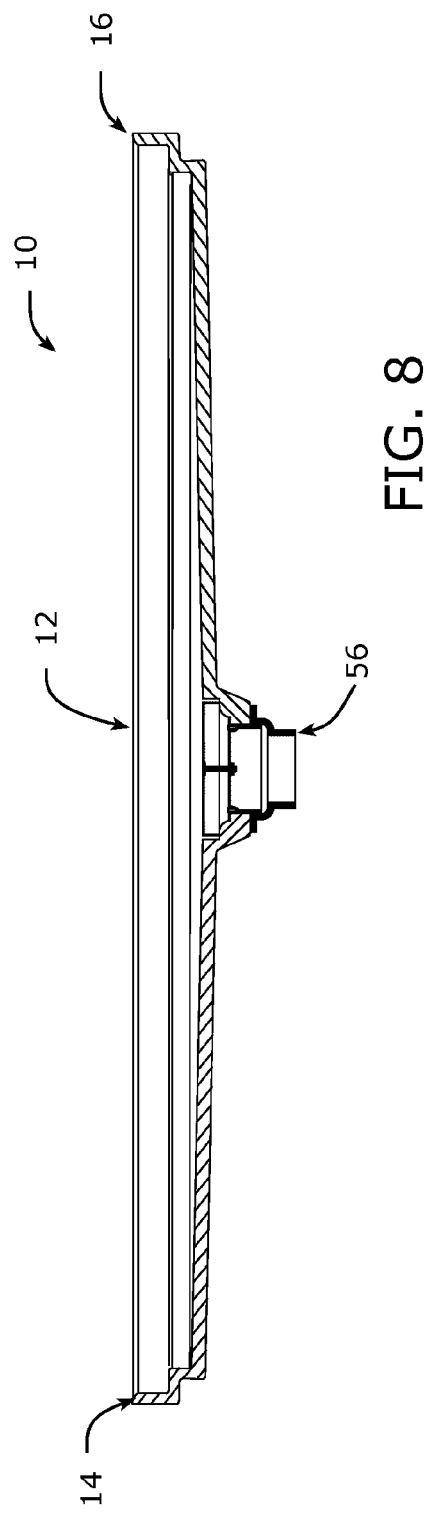
FIG. 8 is a cross-sectional view of the shower pan taken along line 8-8 of FIG. 1.

An apertured grill or cover plate assembly 36 (best shown in FIG. 4) is mounted upon and removeably attached to upper surface of the shower pan 10 and, as shown in FIGS. 1-4, includes a linearly extending section 38 at or near the front edge of the shower pan 10, a section 40 that connects to the section 38 at a mid-point thereof and extends at a substantially perpendicular angle to connect with a drain cover 42 that generally conforms to the outline of the well 22. The cover plate assembly 36 is preferably fabricated from a stamped stainless steel channel having a width of about 2 inches with depending legs of about 0.075 inches and a sheet thickness of about 0.115 inches. As shown, a multitude of elongated slots 44 are provided in the various sections of the cover plate assembly 36 to facilitate water drainage. In the preferred embodiment, the slots 44 have a length of about 1.125 inches and a width of about 0.25 inches; other aperture shapes are suitable including circular holes and combinations of holes and slots. As best shown in FIG. 4, the sections 38 and 40 of the cover plate assembly 36 are received, respectively, in channels 46 and 48 and can be held in place, for example, by threaded fasteners (an example of which is shown in FIGS. 7 and 8). The channels 46 and 48 function as water drain pathways to the drain 20 into the well 22 and into the central drain 20. In the preferred embodiment, the sections 46, 48, and the drain cover 42 are formed as separate pieces and resistance-welded together to form the cover plate assembly 36; resistance welding provides a measure of flexure so that the cover plate assembly 36 can conform to the above-mentioned angular declination of the section 40 toward the drain cover 42. The well 22 has a depth dimension such that the upwardly facing surface of the drain cover 42 does not create a trip edge relative to the adjacent surface patches 28-1, 28-1, 30, 32, and 34.

Figure 5:
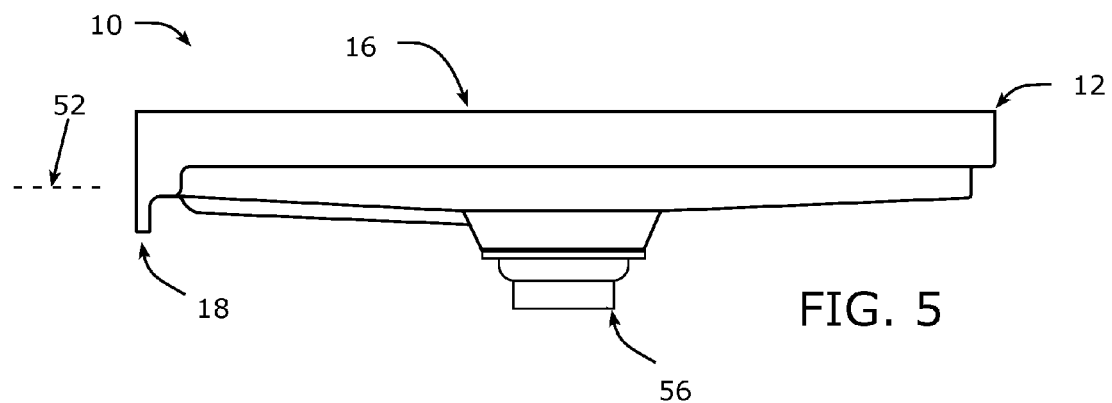
FIG. 5 is an end view of the shower pan.

As shown in FIGS. 5 and 6 and on the left side of FIG. 6, the shower pan 10 is typically installed so that a sill surface 50 is at the same elevation as the pre-existing floor 52. In those installations in which a shower stall (not shown) is erected about the edges of the shower pan 10, a sliding or hinged door 54 (shown in dotted-line on the left in FIG. 6) is located above the sill surface 50 and serves to prevent to limit water from leaking out of the shower pan 10.

During use, water falling of the shower pan 10 will drain down the declining surface patches 28-1, 28-1, 30, 32, and 34 and along grooves 24-1, 24-2, 24-3, and 24-4 to and into the well 22 that receives the drain cover 42. Additionally, water directly or indirectly falling upon section 38 of the cover plate assembly 36 will drain down to the channel 46 and eventually flow to and along the channel 48 into the drain 20. As shown in FIG. 6 and in FIG. 8, a conventional plumbing component 56 and be used to interface the shower pan 10 with the building plumbing system.

As can be appreciated, the shower pan 10, when installed as shown in FIG. 6, does not have any type of 'trip' point or obstruction that could pose a hazard to the user and will not impede assistive aids, such a walkers or wheeled chairs. The section 38 of the cover plate assembly 36 is substantially co-extensive with the front portion of shower pan 10 to accept and drain all or substantially all water falling upon or splashing upon the front portion of the shower pan 10.

While the drain cover 42 has been shown as a "square", a non-square rectangular shape is equally suited and, if desired, non-linear curved shapes such as circles or ovals (i.e., ellipticals) are equally suited.

In the preferred embodiment, the base portion of the shown pan 10 is fabricated from a fiberglass with an acrylic overlay.

As will be apparent to those skilled in the art, various changes and modifications may be made to the illustrated embodiment of the present invention without departing from the spirit and scope of the invention as determined in the appended claims and their legal equivalent.

The invention claimed is:

1. A shower pan, comprising:
 a floor portion having a rear side and a front side and opposite end sides, the rear and end sides having upstanding walls, the rear, front, and end sides defining corners therebetween, the floor portion declining at an angle from the rear, front, and end sides toward a central drain,
 a first drain channel formed in the floor portion at or adjacent the front side and substantially co-extensive therewith,
 a second drain channel formed in the floor portion intermediate the ends of the first drain channel and extending therefrom to the central drain, and
 an apertured grating having a first portion fitted to the first drain channel and having a second portion fitted to the second channel and having a third portion overlying the drain opening.

2. The shower pan of claim 1, wherein the second drain channel is formed substantially perpendicular to the first drain portion.

3. The shower pan of claim 1, further comprising,
 a drain groove extending from the drain opening toward each corner of the floor portion.

4. The shower pan of claim 1, further comprising,
 a well in the floor portion in which the drain opening is formed, the well having a square shape with a drain groove extending from each corner of the well toward a respective corner of the floor portion.

5. The shower pan of claim 4, wherein the third portion of the apertured grate is received within the well and overlies the drain opening.

6. The shower pan of claim 5, wherein the second drain channel formed in the floor portion intermediate the ends of the first drain channel extends therefrom to the well.

7. The shower pan of claim 6, wherein the third portion of the apertured grate is received with the well and overlays the drain opening.

8. The shower pan of claim 4, wherein the second drain channel formed in the floor portion intermediate the ends of the first drain channel is substantially perpendicular to the first drain channel and extends therefrom to the well.

9. The shower pan of claim 8, wherein the second drain channel formed in the floor portion intermediate the ends of the first drain channel is substantially perpendicular to the first drain channel and extends therefrom to the well.

10. The shower pan of claim 1, further comprising,
 a well in the floor portion in which the drain opening is formed, the well having a non-square rectangular shape with a drain groove extending each from each corner of the well toward a respective corner of the floor portion.

* * * * *